June 30, 1964  G. E. WISE  3,139,209
COMBINED TRIVET AND DRIP CATCHER
Filed Feb. 12, 1962

INVENTOR
Glenn E. Wise

United States Patent Office 3,139,209
Patented June 30, 1964

3,139,209
COMBINED TRIVET AND DRIP CATCHER
Glenn E. Wise, 2415 39th Place NW., Washington, D.C.
Filed Feb. 12, 1962, Ser. No. 172,548
3 Claims. (Cl. 220—23.83)

This invention relates to a trivet-including structure, and, more particularly, to a trivet combined with a drip catching, spout-including receptacle.

The normal purpose of a trivet is to support a hot or cold food-serving vessel in spaced relation to and above a table top or the like in such fashion that heat from, or surface condensation on the vessel will not damage the table top. The structure of this invention admirably performs the aforesaid purpose, but, in addition, the drip catcher feature insures that falling condensate or liquids spilled from vessels supported by and on the trivet portion of the invention will not damage the table top. One object of the invention, therefore, is to provide a support for hot or cold food-serving vessels.

Another object of the invention is to provide a combined trivet and drip catcher for supporting food-serving vessels on a table in such manner that spilled liquids, condensate or heat from said vessels will not mar or damage the table.

Another object of the invention is to provide a device of the class described which is easily transported from place to place; which is easily emptied of caught liquids; and which is constructed of parts easily disassembled for washing or separate use.

Another object of the invention is to provide a trivet structure having means for substantially preventing a food-serving vessel from slipping off of the trivet portion of the structure as the vessel is being supported or transported thereon.

Other objects will be apparent from the remainder of the specification and from the drawings.

Figure 1:
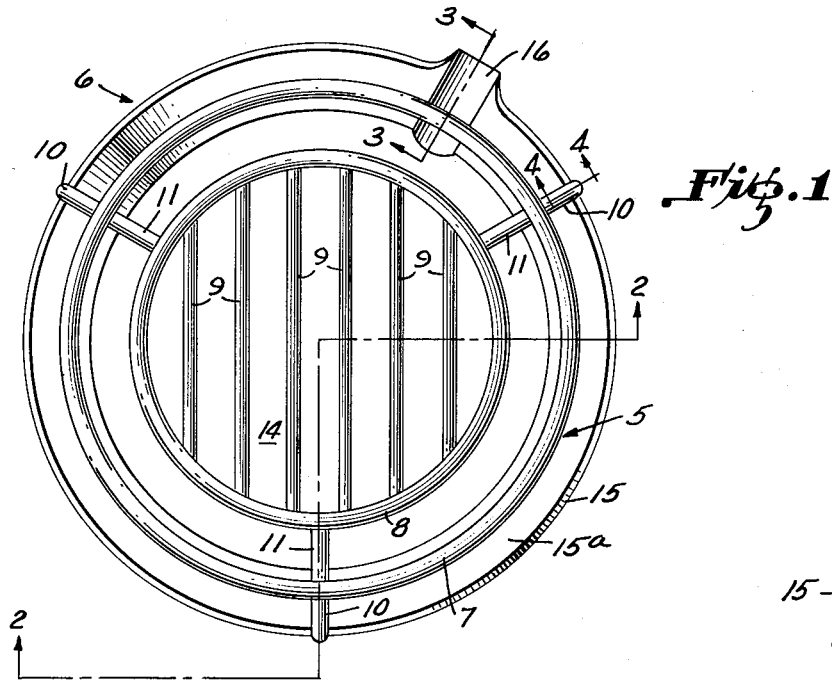
Figure 4:
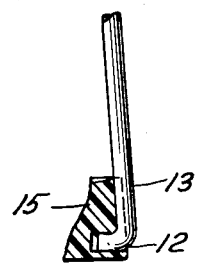
Figure 3:
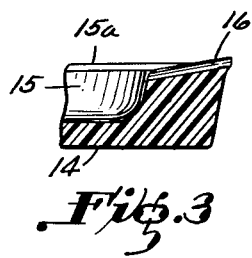
Figure 2:
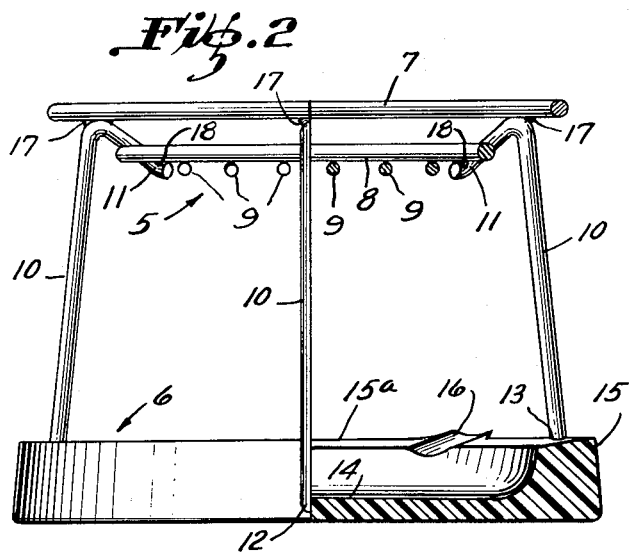

In the drawings which form a part of this application:
FIGURE 1 is a plan view of the invention;
FIGURE 2 is a vertical sectional view taken on the line 2—2 of FIGURE 1;
FIGURE 3 is a partial sectional view of the drip catching receptacle's spout taken on the line 3—3 of FIGURE 1; and
FIGURE 4 is a partially sectional view, showing how the trivet portion of the invention is removably attached to the drip catching receptacle, taken on the line 4—4 of FIGURE 1.

Referring now to the drawings, by reference numbers, 5 designates generally the trivet portion of the invention and 6 designates generally the drip catcher portion thereof. Trivet portion 5, more particularly, consists of an upper large ring 7, a lower small ring 8, coaxial with and parallel to ring 7, horizontal support bars 9 which span and are attached, as by welding or the like (not shown), at their opposite ends to the underside of ring 8, and three upwardly sloping, somewhat C-shaped legs which have their respective inwardly bent top ends 11 attached, as by weldments 17 and 18, or the like, to the undersides of rings 7 and 8 in such fashion that the angular spacing (in plan view) from each leg to the next is equal. The respectively inwardly bent lower ends 12 of legs 10, see FIGURE 4, are removably received in substantially L-shaped sockets 13 in the drip catcher portion 6. Sockets 13 will be further described hereinbelow. All parts of trivet portion 5 are preferably formed of metal rod or bar stock, although molded plastic construction is also suitable.

Trivet portion 6, more particularly, is preferably formed of heat-resistant, water proof plastic or ceramic material and includes a base portion 14 and an integral upstanding peripheral flange 15, which elements 14 and 15 form the shallow upwardly open drip catching receptacle mentioned hereinabove. The top wall 15a of flange 15 is sloped slightly downwardly and inwardly so that liquid falling thereon will flow into the receptacle.

To enable liquid caught in the drip catching receptacle to be easily poured therefrom, I provide a spout 16, FIGURES 1, 2 and 3, which is formed integral with and extends outwardly slightly from flange 15.

As mentioned briefly above, sockets 13 are formed in the periphery of flange 15 to receive the lower ends 12 of legs 10. These sockets 13 are molded into catcher portion 6 when it is cast, or otherwise formed, and, as will be noted, each includes a horizontally oriented portion which removably receives a leg end 12 and an inwardly upwardly sloping substantially half-round portion in which nests the lower extent of a leg 10. It should be apparent that to remove the trivet portion 5 from the drip catcher portion 6 all that it is necessary for a person to do is to simultaneously spring the lower ends of the three legs 10 outwardly relative to the catcher portion 6, whereby the leg ends 12 are removed from the sockets 13, and, while legs 10 are so sprung, lift trivet portion 5 upwardly away from portion 6. Assembly of portions 5 and 6 is the opposite of the disassembly procedure just described.

Although it is preferred that the two portions 5 and 6 be used in assembled condition as shown in FIGURES 1 and 2, it will be apparent that each portion may be used separately if desired. For example, trivet portion 5 can serve as a trivet even though it be separated from portion 6, and portion 6 can be used by itself as a cooking spoon rest or coaster or ash tray, or the like.

In the assembled condition shown in FIGURES 1 and 2, one mode of use is as follows: A food-serving vessel such as a cup or mug may be supported directly upon bars 9 within ring 8. Ring 8, thus limits horizontal movement of the cup or mug relative to portion 5. Any condensate or drips originating from the cup or mug will fall downwardly into portion 6 from which they may conveniently be emptied when desired by way of spout 16.

Transport of the invention in its assembled state is most easily accomplished by insertion of a carrier's hand, palm upward, into the space between the top of wall 15a and the underside of bars 9 followed by engagement of the hand with the bars 9 to dictate whatever movement of the device that is desired.

In cases where a user desires to support on portion 5 a vessel having a base thereon larger than the diameter of ring 8, then the underside of such a vessel (for example, a saucer or bowl) will be engaged with ring 7. Ring 7 will, in such case, cradle the vessel in such manner as to inhibit its movement relative to portion 5, whereby the possibility of sloshing of liquid in the vessel, or in another vessel on the trivet-engaging vessel, during transport is somewhat lessened. In some instances, saucers and bowls are of such design that their bases will rest on bars 9 while their outwardly sloping undersides rest upon ring 7.

It will be obvious to those skilled in the art that various changes might be made in the invention without departing from the spirit thereof as defined in the claims. For example, other means might be employed for removably joining the portions 5 and 6 together.

Having now illustrated and described one complete embodiment of my invention, what I claim as new and desire to secure by Letters Patent is:

1. A device of the character described comprising: a trivet portion, said trivet portion including vessel supporting means and flexible leg-forming means attached to said vessel supporting means; an upwardly open receptacle underlying said vessel supporting portion; and cooperable means on said leg-forming means and on said receptacle removably joining said trivet portion to said receptacle portion, said cooperable means including horizontally extending socket means in said receptacle and socket-engaging means on said leg-forming means.

2. The combination of claim 1 wherein said receptacle is spaced a substantial distance below said vessel supporting means, said socket means comprising a plurality of outwardly opening spaced sockets formed in a peripheral wall of said receptacle.

3. The combination of claim 2, said leg-forming means comprising a plurality of spaced legs each having an upper and a lower end, each of said legs being attached at its upper end to said vessel supporting means and having a horizontally extending lower end engaged in one of said sockets.

References Cited in the file of this patent

UNITED STATES PATENTS

| | | |
|---|---|---|
| 560,510 | Liesenberg | May 19, 1896 |
| 1,472,598 | Jarvis | Oct. 30, 1923 |
| 1,918,117 | Martin | July 11, 1933 |
| 2,341,136 | Brittingham | Feb. 8, 1944 |
| 2,673,053 | Kilian | Mar. 23, 1954 |